United States Patent [19]

Tschantz

[11] Patent Number: 5,107,983
[45] Date of Patent: Apr. 28, 1992

[54] FOLD-OVER CONVEYOR BELT

[75] Inventor: William H. Tschantz, Canton, Ohio

[73] Assignee: Harrison Handling, Inc., Canton, Ohio

[21] Appl. No.: 637,769

[22] Filed: Jan. 7, 1991

[51] Int. Cl.⁵ ............................................. B65G 15/40
[52] U.S. Cl. ................................... 198/819; 198/821
[58] Field of Search ............ 198/818, 819, 820, 821, 198/823, 847

[56] References Cited

U.S. PATENT DOCUMENTS

| | | |
|---|---|---|
| 2,199,935 | 5/1940 | Johns . |
| 2,303,762 | 12/1942 | Reimel et al. ............... 198/847 X |
| 2,365,762 | 12/1944 | Johns et al. . |
| 2,839,180 | 6/1958 | Ackers . |
| 2,839,181 | 6/1958 | Renner ............................. 198/819 |
| 2,998,121 | 8/1961 | Gilbert ......................... 198/823 X |
| 3,368,664 | 2/1968 | Skinner .............................. 198/847 |
| 3,557,941 | 1/1971 | Thomson ........................... 198/818 |
| 3,578,149 | 5/1971 | Thomson ........................... 198/818 |
| 3,615,152 | 10/1971 | Bouzat et al. ................ 198/818 X |
| 3,630,340 | 12/1971 | Bouzat et al. ................ 198/818 X |
| 4,410,082 | 10/1983 | McGinnis ........................... 198/818 |
| 4,709,806 | 12/1987 | Candle ............................... 198/819 |
| 4,760,913 | 8/1988 | Tschantz ........................... 198/819 |
| 4,819,791 | 4/1989 | Melander ...................... 198/819 X |
| 5,004,098 | 4/1991 | Marshall ...................... 198/821 X |

FOREIGN PATENT DOCUMENTS

| | | |
|---|---|---|
| 1079544 | 4/1960 | Fed. Rep. of Germany ...... 198/818 |
| 1112884 | 3/1956 | France .................................. 198/818 |
| 207206 | 12/1983 | Japan . |
| 0043114 | 2/1990 | Japan ................................... 198/819 |
| 418677 | 5/1934 | United Kingdom ................. 198/628 |
| 2195309 | 4/1988 | United Kingdom ................. 198/819 |

OTHER PUBLICATIONS

Belt Conveyors and Belt Elevators, pp. 16–19, Frederic V. Hetzel, M.E., 1922.

Primary Examiner—Robert P. Olszewski
Assistant Examiner—James R. Bidwell
Attorney, Agent, or Firm—Michael Sand Co.

[57] ABSTRACT

This invention relates to an endless fold-over type of conveyor belt for use in conveying relatively-loose bulk material in an enclosed manner to prevent spillage, dusting and contamination of the material and allows belt to operate at steep angles. The belt comprises essentially a rectangular uniform cross-sectional shape having a substantially greater width than thickness. Two similar series of plural closely-spaced longitudinal grooves are located on the load-carrying side of the belt spaced on both sides of the belt medial portion to provide a pair of hinged areas for folding and unfolding the belt. The longitudinal grooves preferably are V-shaped or U-shaped and two to four in number, spaced in an individual array at about one-quarter the belt width from its edges to provide a pair of overlapping edge flaps to cover the medial area when in folded relation.

14 Claims, 3 Drawing Sheets

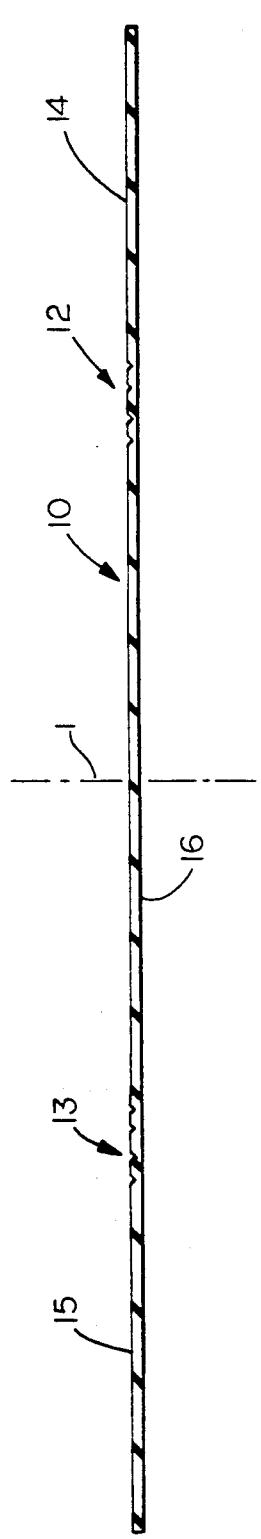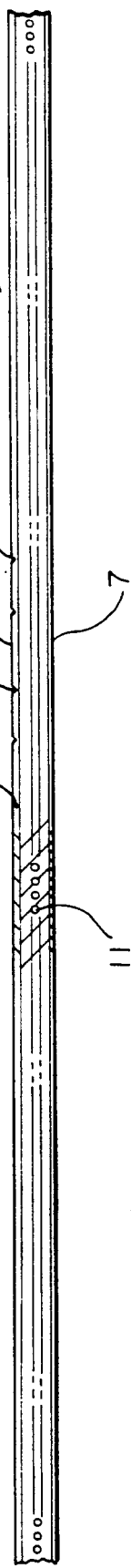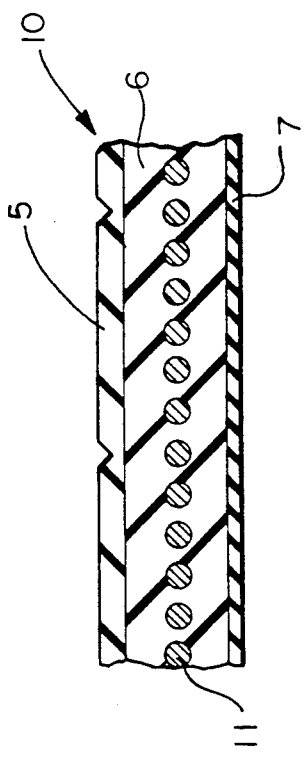
FIG. 1
FIG. 2
FIG. 2A

FOLD-OVER CONVEYOR BELT

BACKGROUND OF THE INVENTION

1. Technical Field

The subject invention relates to a flexible endless conveyor belt having a fold-over capability for conveying relatively-loose bulk material from one point to another especially along steep inclines and declines, the belt cover-flaps completely enclosing the load while it is conveyed.

2. Background Information

The subject invention which relates to an endless folding belt adapted for use in belt conveyor systems provides a significant improvement in such systems wherein the belt has a substantially longer service life at its hinged areas.

The belt is adapted for use in conveyor systems to move the folding belt by drive rolls while supported in intermediate areas on idler rolls, the belt having a pair of continuous flexible longitudinal cover or hinge flaps which permit the flaps to be folded and unfolded to facilitate loading and unloading of the belt at several load handling stations or positions. The folding belt is normally folded to enclose bulk materials during their transport from one position to another to eliminate spillage of the load or its contamination during transport and to permit the load to move along steep inclines and declines. The folding belt is capable of carrying significantly greater loads without producing dust-emitting conditions in the vicinity of the belt, the belt having an improved construction in its hinged areas for much longer-service life.

Prior forms of such folding belts have heretofore utilized single grooves at their hinged areas which place a much more severe bending moment on the belt in obtaining a hinged effect wherein the belt is essentially folded on itself at the pair of similarly singly grooved areas. Where the belt is formed from flexible elastomeric material, the single grooves are stretched in a severe deleterious manner which shortens belt life where the belts are employed to carry significantly greater volumes of bulk material between loading and unloading positions. Belts having such single grooves at the hinged areas are disclosed in U.S. Pat. No. 4,709,806 along with known types of conveyor systems for transport of loose materials in an enclosed manner. While the singly-grooved hinged areas have been used previously the amount of undue stress placed on the belt at the twin hinged areas causes excessive wear thereat shortening belt life and requiring increased maintenance.

Prior to the advent of fold-over belts, open belts have been used previously in the art to convey bulk materials in a manner open to the atmosphere. In view of inherent dusting problems, the industry has utilized metal shrouding or other forms of enclosure of the belt to eliminate contamination dusting and to maintain the conveyed material in an essentially clean and uncontaminated condition. The use of shrouding occasionally results in accumulation of dust and in some cases a creation of explosive mixtures which occurrences are particularly dangerous and to be avoided. Prior to the use of folding-belt conveyor systems, such systems were objectionable in allowing spillage of the conveyed material frequently due to belt construction and its mounting for continuous movement. There has been a need in the art for an improved fold-over belt structure having much longer service life which requires lesser maintenance and downtime due to belt failure or weaknesses requiring costly belt replacement.

Furthermore, since fold-over belts can go up steep angles due to the pressure of the top flaps trapping material against the bottom carrying side of the belt, it is mandatory that the belt have a controlled cross section so that the material will not slide back along the belt in steep angles. Therefore, it is necessary to close the top flaps as much as possible to match the cross sectional area of the belt to the material being carried thereby.

SUMMARY OF THE INVENTION

It is an object of this invention to provide an improved fold-over belt having improved hinged areas which provide much longer service life for long-term operation of the belt in a wide variety of conveyor systems.

It is a further object of this invention to provide an improved fold-over belt comprised of flexible elastomeric material having hinged areas wherein the fold lines have the inherent stresses distributed over longer lineal areas of the belt width in such manner that the stresses are uniformly distributed so as not to exceed the normal limits of localized stress.

It is another object of this invention to provide a fold-over type conveyor belt wherein its similar hinged areas are comprised of a series of V-shaped or U-shaped grooves in the load-carrying side of the belt to constitute wider fold lines in juxtaposed areas of the belt which are not concentrated in a single limited area of the belt but wherein the stresses are distributed over longer cross-sectional portions of the belt with lesser concentration of bending moment stresses thereat.

It is another object to provide a fold-over belt which provides a relatively flat folded edge when in a folded position enabling side rolls to be utilized.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a cross-sectional transverse view of the belt showing the multiple grooves at the two similarly hinged areas of the belt;

FIG. 2 is a slightly enlarged cross-sectional view of one portion of the belt shown in FIG. 1 showing one hinged area in greater detail;

FIG. 2A is an enlarged fragmentary sectional view of the improved fold-over belt;

Similar numerals refer to similar parts throughout the drawings.

DESCRIPTION OF THE PREFERRED EMBODIMENTS

Figure 3:
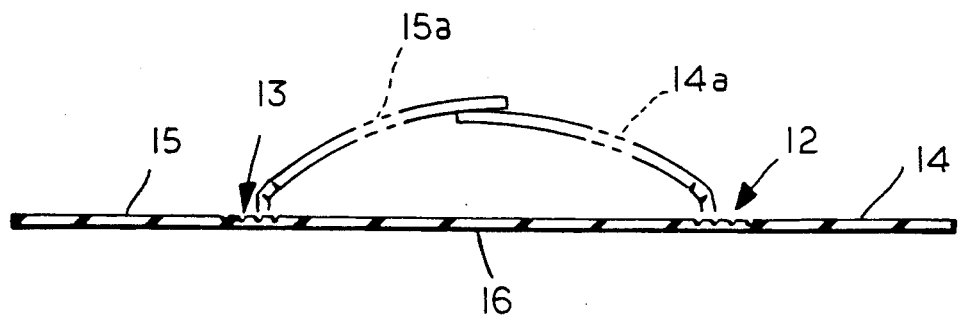
FIG. 3 is a vertical cross-sectional transverse view of the belt in open relation and also showing in dotted outline the closed relation of the belt.

A typical folding belt conveyor is shown and described in U.S. Pat. No. 4,709,806 entitled "Folding Belt System and Said Belt", issued Dec. 1, 1987, assigned to the Goodyear Tire and Rubber Company. In such a system the continuous endless belt passes over a head-roll or pulley and a tail-roll or pulley normally called terminals which are usually located at different elevations. The intermediate area of the belt is supported by a plurality of idler rolls which support the belt in both its open and closed positions. Such system is normally constructed so that three in-line rolls are mounted to cause the belt to form a conventional trough shape in its load carrying arrangement. The rolls may be straight or contoured in such systems which also include tensioning mechanisms to maintain the belt in proper tension to provide for proper driving of the belt in continuous movement for carrying loads such as relatively loose bulk materials without spillage or contamination. Various types of conveyor systems may utilize the fold-over belt of the present invention as set forth hereinbelow.

Referring to the drawings and specifically FIGS. 1, 2 and 2A, belt 10 preferably is formed of three separate layers of a flexible elastomeric material such as rubber, consisting of a top layer 5, an intermediate layer or carcass 6, and a bottom layer 7. Intermediate layer 6 has longitudinal strengthening cords 11 extending lengthwise throughout. The cords are disposed internally of the belt in longitudinal spaced-apart parallel relation to provide increased strength to the belt for its tensioning without undue elongation or stretching and to assist in retaining its rectangular relatively smooth shape. Only a portion of the total number of cords 11 is shown in cross-section in FIG. 2.

In the preferred embodiment, layer 5 will be approximately 3/16 inch thick, intermediate layer 6 is between 3/16 and ⅛ inch thick, and bottom layer is approximately 1/16 inch thick. Furthermore, the belt will have a substantially greater width than thickness as shown in FIG. 1, and will have a generally rectangular cross-sectional configuration.

As shown in FIG. 1, the belt 10 has two similarly shaped arrays 12 and 13 of multiple grooves in its load-carrying covering or top layer 5; the several arrays being preferably spaced equi-distant from the edges of the belt generally one-quarter the width of the belt, to provide foldover or flap portions 14 and 15 which extend from the central medial portion 16 of the belt. The two grooved arrays 12 and 13 preferably have the same number of similarly-shaped grooves to obtain comparable fold-over effects when the end flaps 14 and 15 are rotated through an angle of about 180° or less. The end flaps are capable of swingable folding movement over the medial portion 16 after a load is disposed on the central belt portion. As shown in FIG. 2, the grooved array 12 is shown having four similarly-shaped grooves 17 which provide a unitary fold line to distribute inherent stresses over a longer lineal region of the belt width when the belt is folded. When the belt is folded and unfolded into and out of load carrying relation the grooves 17 which preferably are spaced an equi-distance apart, or have slightly greater spacing in the center portion 18, to more widely distribute the bending moment stresses when the belt is folded upon itself. The grooves are preferably similarly shaped having a V-shape or U-shape and extend into top layer 5 to a position closely adjacent intermediate layer 6 but not through layer 5, which could damage the reinforcement provided by layer 6.

As shown in FIG. 3, the belt having the plural longitudinal grooves in paired locations is shown in planer relation as manufactured and as may be employed in use on some types of conveyor systems. The end flaps 14 and 15 are shown in dotted outline as they are moved vertically upwardly over the medial portion 16 of the belt into closed load-carrying relation. Numerals 14a and 15a show the pair of end flaps in closed relations with their edge portions overlapped to completely enclose the load (not shown).

Figure 4:
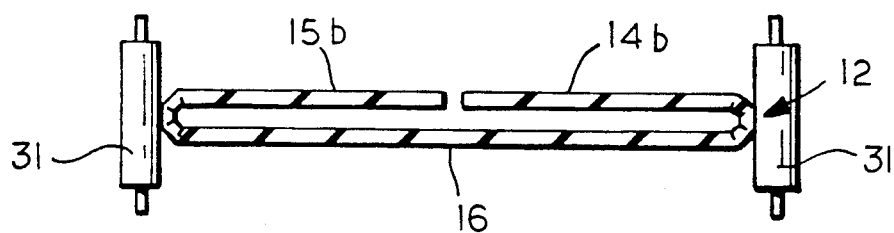
FIG. 4 is a vertical cross-sectional transverse view of another embodiment of the belt in closed relation in combination with side rolls.
Figure 5:
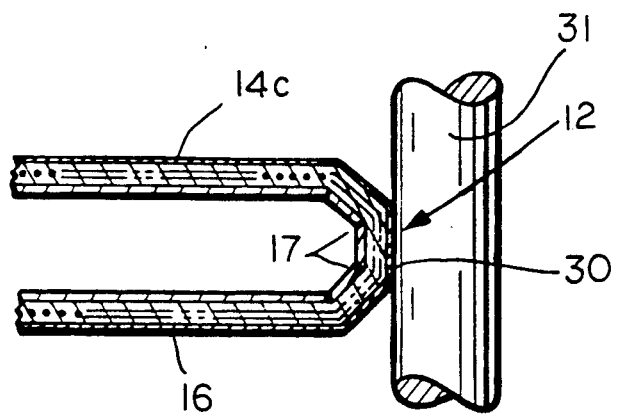
FIG. 5 is a enlarged vertical cross-sectional view of one hinged portion of the belt of FIG. 4 showing the multiple grooves in folded relation closing the belt in one form of load carrying relation and engaged with a side roll.

FIG. 4 shows in yet another embodiment of the belt how the end flaps 14b and 15b may be rotated through an angle of about 180° or less over the medial portion 16. The plurality of V-shaped grooves at the hinged areas is shown in greater detail in FIG. 5 wherein swingable rotation of the end flap of the belt closes the grooves distributing the inherent stresses and stretching of the belt over a much wider lineal region over a wider hinge line. The individual grooves 17 are closed into face-to-face relation wherein a lesser amount of stretch of the order of about 17 percent stretch at each of the individual grooves is created lessening the amount of stresses created at any individual localized region of the belt.

Another important feature of the improved fold-over belt is that a flat exterior edge or side 30 is provided along each belt edge which can be easily engaged by side rolls 31. Rolls 31 provide increased belt control especially in horizontal curves without damage to the belt which can occur where only a rounded edge is engaged by the roll as in prior fold-over belts.

Figure 6:
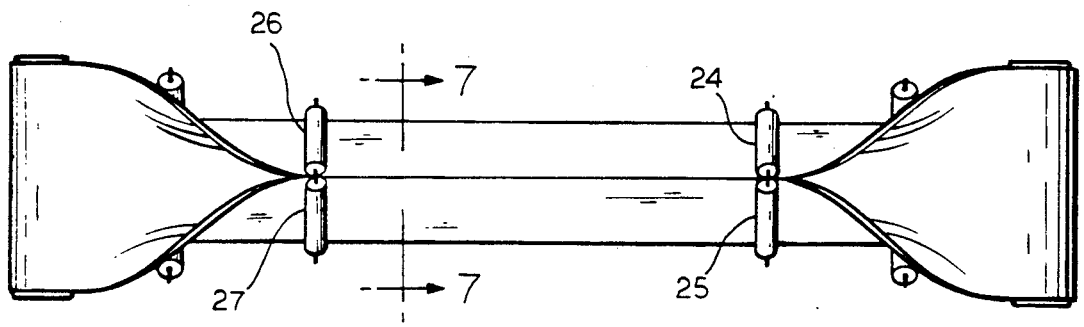
FIG. 6 is a top plan view of the belt showing its open and closed positions between loading and unloading positions in a typical conveyor system.

Referring to FIG. 6 of the drawings, on a typical conveyor apparatus, the endless belt is shown in both and open closed relation such opening and closing being effected by contoured rolls located both beneath and over the belt in the closing area. Such view is a schematic view shown in simplified form; the various idler rolls having various contoured configurations to achieve desirable opening and closing of the belt. As shown in FIG. 6 rolls 24 and 25 serve to close the belt over the load while rolls 26 and 27 serve to open the belt for discharge of the conveyed load.

Figure 7:
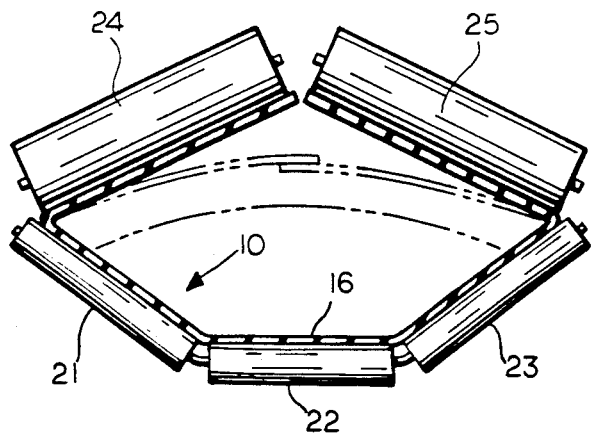
FIG. 7 is a cross-sectional view taken along the line 7—7 of FIG. 6 showing the central portion of the belt having a deeper medial region for greater load carrying capability with the end flaps in closed relation.

FIG. 7 shows a series of three idler rolls 21, 22 and 23 supporting the medial region 16 of the belt with idler rolls 24 and 25 closing the edge flaps over the load retained on the belt medial portion. The edge flaps are preferably overlapped on closing to completely contain the load although the flaps may be either totally closed or slightly spaced-apart depending upon the nature of the bulk materials being conveyed. Additional top roller rolls are employed at other areas of the belt during its movement to retain the belt closed until it opened for load discharge at the belt opening position.

An endless fold-over belt which is particularly useful in this invention is a belt formed of usual rubber compositions such as a sulfur carbon black butadiene styrene or butadiene acrylonitrile rubber, which are preferably cook-cured at an elevated temperature ranging from about 40° C. to 190° C. preferably to about 30 to 40 percent of its cure in the flat unfolded open position with the plural longitudinal grooves molded into the belt. In the areas where the plural grooves are formed, the end flaps are then laid over to bring the edges into the laid-over position normally with the end flaps overlapped so that when in use on the conveyor the belt is completely closed. The belt is then finally cured in its folded arrangement with the end flaps overlying the central portion. The grooves may be supported with shims during such final curing. Further details of manufacture of the belt and testing thereof are set forth in the aforesaid U.S. Pat. No. 4,709,806 wherein the hinged grooves may be molded into the belt during curing; however, the aforesaid U.S. patent does not disclose anything other than forming single fold lines at the hinged areas. The grooves may also be cut with knives into the belt or grooved into the belt with abrading wheels. Such single grooves create areas of inherent weakness in long-term operation of such fold-over belts.

Accordingly, the improved endless conveyor belt of this invention is simplified provides an effective, safe, inexpensive, and efficient device which achieves all the enumerated objectives, provides for eliminating difficulties encountered with prior art devices such as belt breakage, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved conveyor belt is constructed and used, the characteristics of the construction, and the advantageous, new and useful results obtained; the new and useful structure, devices, elements, arrangements, parts and combinations, are set forth in the appended claims.

I claim:

1. A flexible endless conveyor belt having a fold-over capability for conveying relatively-loose bulk material loads in an enclosed manner, said belt comprising an essentially uniform rectangular cross-section formed of flexible resilient elastomeric material having a substantially greater width than thickness, the load carrying side of said belt having two similar series of plural closely-spaced longitudinal grooves located generally at about one-quarter the width of said belt from its edges, said series of grooves providing a pair of hinged areas for rotating the outer portions of said belt inwardly upon itself to enclose a load on the belt medial portion when rotated to a belt closed position.

2. A flexible endless conveyor belt in accordance with claim 1, wherein the belt has a top load carrying layer, an intermediate reinforcing layer, and a bottom layer.

3. A flexible endless conveyor belt in accordance with claim 2, wherein the said two similar series of plural closely-spaced longitudinal grooves extend substantially into the top load carrying layer.

4. A flexible endless conveyor belt in accordance with claim 1, wherein the said two similar series of plural longitudinal grooves each consist of about two to four V-shaped grooves in equi-spaced relatively close array adapted to improved folding of said belt thereat and improved belt life.

5. A flexible endless conveyor belt in accordance with claim 1, wherein the said two similar series of plural longitudinal grooves are essentially V-shaped in cross-section for each to provide a comparable bending moment when the outer edge portions are rotated inwardly about 180° or less on folding to an essentially closed position.

6. A flexible endless conveyor belt in accordance with claim 1, wherein the said belt has four grooves in each series which are spaced transversely apart; and wherein each of the said grooves provides about 17 percent stretch on the elastomeric material at said grooves upon closing rotation of the end flap portions at said hinged areas of said belt.

7. A flexible endless conveyor belt in accordance with claim 2, wherein each of the said two similar series of plural longitudinal grooved areas are formed in the top load carrying layer and comprise a unitary hinge line for repeated concurrent folding and unfolding of the two edge portions over and from the load-carrying medial portion of said belt.

8. A flexible endless conveyor belt in accordance with claim 7, wherein the said longitudinal grooved areas each consist of four similar V-shaped grooves having a depth less than the thickness of the top layer of the belt.

9. A flexible endless conveyor belt in accordance with claim 1, wherein the said two similar series of plural longitudinal grooves comprise hinged areas in the belt with the portions outside the hinged areas comprising similar equilength cover flaps.

10. A flexible endless fold-over conveyor belt for conveying relatively-loose bulk material in an enclosed manner, said belt comprising an essentially uniform rectangular cross-sectional shape having a substantially greater width than thickness and formed of flexible resilient elastomeric material and having a top load-carrying side, said load-carrying side having two similar arrays of plural closely-spaced longitudinal grooves located adjacent longitudinal edges of said belt, said two arrays of longitudinal grooves providing a pair of hinged areas for rotating the outer portions of said belt inwardly upon itself to enclose a load on the belt medial portion between said two grooved arrays.

11. A flexible endless fold-over conveyor belt in accordance with claim 10, wherein the belt has a reinforced carcass; and in which the two similar arrays of plural longitudinal grooves extend into the load-carrying side but terminate prior to the reinforced carcass.

12. A flexible endless fold-over conveyor belt in accordance with claim 10, wherein the said two similar arrays of plural longitudinal grooves each consist of about two to four V-shaped grooves in equi-spaced close arrangement adapted to provide a unitary hinged area.

13. A flexible endless fold-over conveyor belt in accordance with claim 10, wherein each of the said two similar arrays of plural longitudinal grooved areas comprise a unitary hinged area for repeated concurrent folding and unfolding of the two edge portions over and back from the load-carrying medial portion of said belt.

14. A flexible endless fold-over conveyor belt in accordance with claim 10, wherein the belt has a reinforced carcass; and in which plural longitudinal grooves of said two similar spaced-apart arrays each consist of about four similar V-shaped grooves having a uniform depth substantially into the load carrying side but free of contact with the reinforced carcass.

* * * * *